United States Patent [19]

Hsu

[11] Patent Number: 4,554,755
[45] Date of Patent: Nov. 26, 1985

[54] SEATING DEVICE FOR FISHING REEL

[76] Inventor: Jeng-Hsiung Hsu, 10-11 Floor, No. 283, Tzu-Li I Rd., Kao-Hsiung City, Taiwan

[21] Appl. No.: 556,990

[22] Filed: Dec. 1, 1983

[51] Int. Cl.⁴ ............................................. A01K 87/06
[52] U.S. Cl. ........................................................ 43/22
[58] Field of Search .................................... 43/22, 19.2

[56] References Cited

U.S. PATENT DOCUMENTS

| | | |
|---|---|---|
| 285,346 | 9/1883 | Doubleday ............... 43/22 |
| 676,348 | 6/1901 | Bell ............................ 43/22 |
| 2,289,216 | 7/1943 | Seidel ........................ 43/22 |
| 2,479,952 | 8/1949 | Matson ...................... 43/22 |
| 2,612,714 | 10/1952 | Coleman .................. 43/22 |
| 3,401,482 | 9/1968 | Burns ........................ 43/22 |
| 3,461,594 | 8/1969 | Ohmura .................... 43/22 |
| 3,499,241 | 3/1970 | Ruppa .................... 43/19.2 |
| 4,237,640 | 12/1980 | Sato .......................... 43/22 |

FOREIGN PATENT DOCUMENTS 1234 of 1884 United Kingdom .................... 43/22

Primary Examiner—Nicholas P. Godici
Assistant Examiner—M. Jordan
Attorney, Agent, or Firm—Fitch, Even, Tabin & Flannery

[57] ABSTRACT

A reel seat for a fishing reel of the type having a reel foot is comprised of, a bar seat with its bottom surface shaped to conform to the contour of the fishing rod having two arched flanges at its two ends and an intermediate recessed arch surface for thread-wrapping. A hood member for receiving one end of the reel foot is integrally formed with one end of the bar seat. Toothed members are provided on the upper side of the seat for positioning a securing device which is slidably mounted on the bar seat. The securing device includes, a casing having a socket for receiving the other end of the reel foot, a pawl pivotedly mounted in the casing and normally biassed by a spring to engage the toothed members and a presser for depression to move the pawl away from the tooth members.

2 Claims, 5 Drawing Figures

SEATING DEVICE FOR FISHING REEL

BACKGROUND OF THE INVENTION

This invention is related to reel seats for fishing rods, particularly to a reel seat which can make an attachment of the reel to the fishing rod in a firm and stable position.

Various forms of reel seats have been provided for attachment of fishing reels to fishing rods. There is a method to attach the reel to the fishing rod by providing, as shown in FIG. 1, a fixed hood 11 and a movable hood 12 which have two sockets 11a and 12a respectively for receiving two ends of the reel foot 13. A guide screw 14 operated by hand is provided to drive the movable hood 12 towards the fixed hood 11 and to fix the reel foot by the screw engagement of the guide screw 14 and the screw threads 15 provided on the fishing rod 16.

Referring to FIG. 2, there is another form of reel seat 20 which includes a bar seat 20 and a slidable securing means 21, the bar seat 20 having two attachment curved end surfaces 22, 23 and an intermediate curved surface 24 to be tied to the fishing rod with wires or strings. At one end of the bar seat 20 is provided a fixed attachment socket 25 for receiving one end of the reel foot 26. The slidable securing means 21 includes an attachment socket 27 for receiving the other end of the reel foot 26, and a bent spring plate 28 which has one end 28a to engage the toothed surface 29 of the bar seat 20 when the presser member 29a is depressed. The reel foot 26 is fixed to the fishing rod when the securing means 21 is moved toward the attachment socket 25 and the presser member 29a is depressed.

The above reel seats are found deficient. As the former is a fixed type, replacement can not be made in that case. In the later case, the attachment of the reel seat by thread-wrapping can not be kept too firm. It is usually made of metal and easily comes loose. The fishing rod may be damaged especially when the reel seat is subjected to load. When the presser member 29a is depressed to fix the reel foot, the end 28a of the spring plate 28 sometimes only abuts against the tip of the tooth, as shown in FIG. 2b. This may cause the slight backward movement of the securing means 21 which tends to loosen the attachment of the reel foot. Further, to detach the reel seat, it is necessary to apply an undesirably large force to lift up the presser member 29a so as to release the bent spring plate 28 from the tooth. Also the fabrication of such reel seat requires several processing steps.

SUMMARY OF THE INVENTION

It is an object of the invention to provide a reel seat which may attach a reel to a fishing rod in a firm and stable position.

The foregoing and other object can be achieved in accordance with the invention through the provision of a reel seat which includes, a bar seat having arch attachment surfaces adapted to abut against the fishing rod, a hood member for receiving one end of the reel foot provided at one end of said seat member, toothed means provided on the upper side of said seat member near the other end thereof, slide way means provided lengthwise on both sides of said seat member, and securing means which includes, a casing having engaging surfaces for engaging said slide way means and slidable on said bar seat, said casing having a socket for receiving the other end of the reel foot, pawl means pivotedly mounted in said casing, spring means normally biassing said pawl means to engage said toothed means, and a hand operated means for moving said pawl means against the biassing action of said spring means.

Advantageously, the hand operated means includes a presser means attached to said pawl means for moving said pawl means away from the toothed means upon being depressed.

The presently preferred exemplary embodiment will be described in detail with reference to the following drawings, wherein;

DETAILED DESCRIPTION OF THE PREFERRED EMBODIMENT

Figure 1:
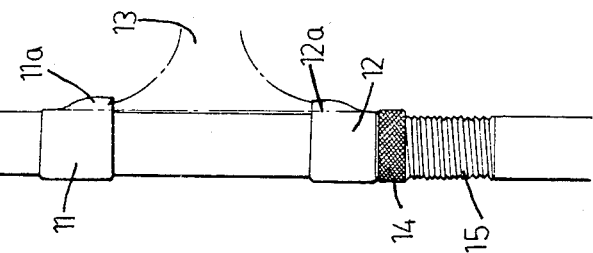
FIG. 1 is a view of a reel seat in the art.
Figure 2:
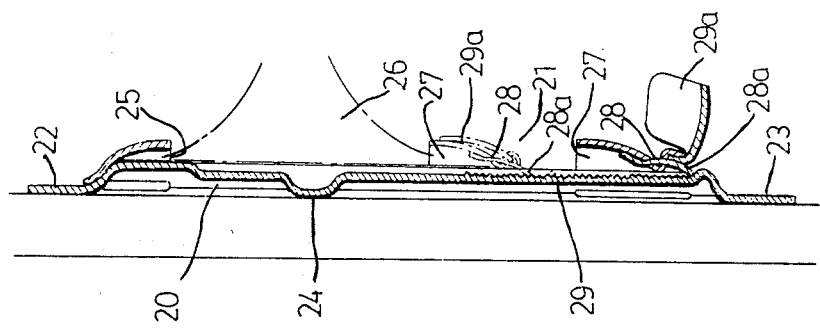
FIG. 2 is a view of another reel seat in the art.
Figure 2B:
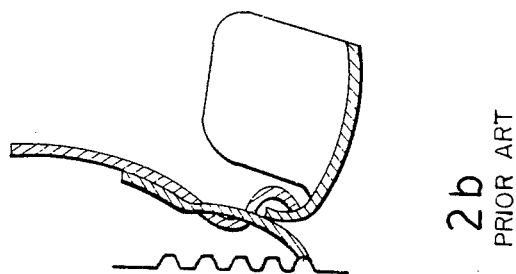
FIG. 2b is an enlarged view of a portion of FIG. 2.
Figure 3:
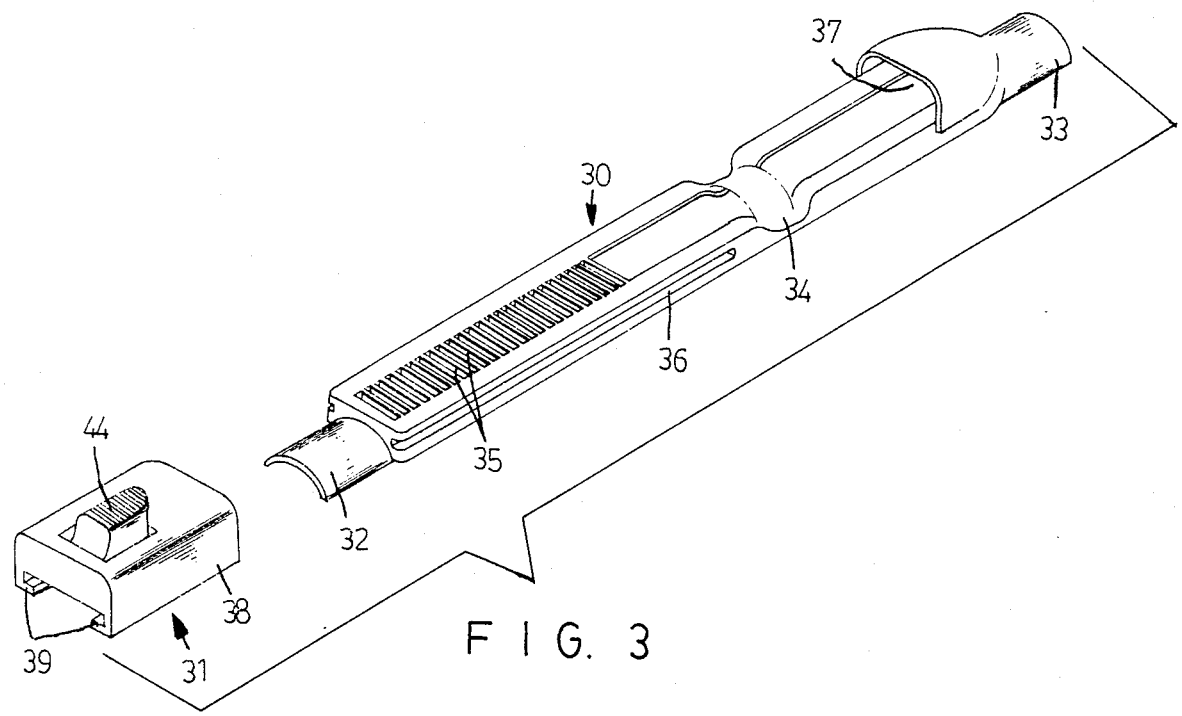
FIG. 3 is a perspective view of a reel seat constructed according to the invention.
Figure 4:
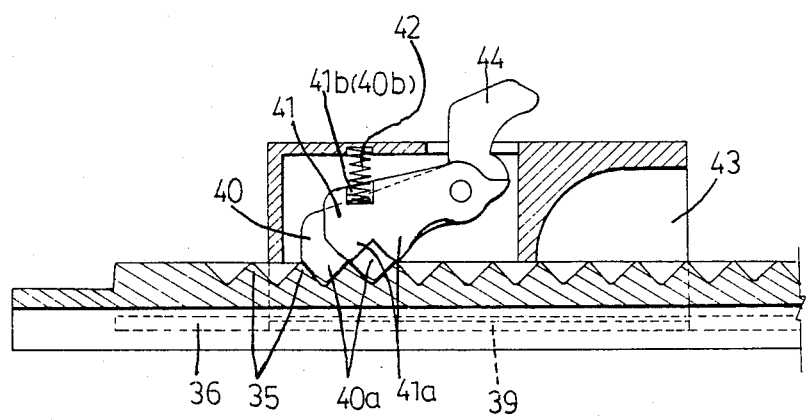
FIG. 4 is a sectioned view of the reel seat.

Referring to FIGS. 3 and 4, there is shown a reel seat which includes, a bar seat 30 and a securing means 31. The bar seat 30 includes a bottom surface (not shown) shaped to conform to the fishing rod for abutment, two arched flanges 32, 33 and an intermediate recessed arch-shaped surface 34 which are adapted for thread-wrapping so as to tie the reel seat to the fishing rod. On the surface of the bar seat 30 is provided toothed members 35 and at one end of the bar seat 30 is provided a hood member 37 for receiving one end of the reel foot (not shown). There are further provided slide ways 36 at both sides of the bar seat 30.

The slidable securing means 31 includes a casing 38 which has two lower guide projections 39 for engaging the slide ways 36 respectively so that the casing 38 can be slid on the bar seat 30. The casing 38 has a socket 43 for receiving the other end of the reel foot (not shown). There are further provided two parallel pawl members 40 and 41 which include teeth 40a and 41a respectively and are pivotedly mounted in the casing 38. The pawl members 40 and 41 are further provided with notches 40b and 41b for receiving two spiral springs 42 respectively which urge the pawl members 40 and 41 to engage teeth 35. A presser member 44 is connected to two pawls 40 and 41 and, when it is depressed, it moves the pawl members 40 and 41 against the biassing actions of the springs 42, thereby releasing them from the engagement with teeth 35.

It is appreciated that a reel can be attached to the fishing rod by firstly fastening the reel seat to the fishing rod by thread-wrapping or gluing, locating two ends of the reel foot into the hood member 37 and the socket 43 of the casing 38 respectively and then moving the slidable securing means 31 toward the hood member 37 until the reel is fixed tight in its position. Thereafter, the slidable securing means 31 is locked against movement by the engagement of the pawl teeth 40a or 41a with teeth 35. It can be appreciated that, when the securing means 31 is moved, the presser member 44 must be in its depressd position. The pawl teeth 40a and 41a are so designed that the distance between the tips of each tooth 40a and each tooth 41a in the longitudinal direction relative to the bar seat 30 is half of the pitch of two adjacent teeth 35 so that the securing means 31 can be locked against backward movement after every half pitch distance movement because of the alternate engagements of the teeth 40a and 41a with teeth 35. Alternatively, there can be provided three pawl members in which the tips of the teeth are arranged at an interval of one third of the pitch of the teeth 35. In this case, the securing means 31 can be locked against backward movement at every distance of one third of the pitch relative to the teeth 35.

With the arrangement of the pawl members described above, the tendency for the reel root to loosen upon backward movement of the securing means 31 in case that the pawl tooth is not well engaged with the teeth 35 is relatively low when compared with the conventional reel foot.

The reel seat according to the invention can be made from molded plastic, and therefore the production cost thereof is low and the device can be glued to the fishing rod directly.

With the invention thus explained, it is apparent that obvious modifications and variations can be made without departing from the scope of the invention. It is therefore intended that the invention be limited only as indicated in the appended claims.

I claim:

1. A reel seat for a fishing reel which has an attachment reel foot comprising;

a bar seat having arched attachment surfaces adapted to abut against the fishing rod; a hood member for receiving one end of the reel foot fixedly provided at one end of said seat; first toothed members provided on the upper side of said seat member; slide way means provided lengthwise on both sides of said seat member; and securing means including a casing having engaging surfaces for engaging said slide way means and slidable on said seat member, said casing having a socket for receiving the other end of the reel foot, pawl means pivotedly mounted on said casing, spring means normally biassing said pawl means to engage said first toothed members, and a hand operated means for moving said pawl means against the biassing action of said spring means, said pawl means including two pivoted parallel arms each of which has a second tooth, the distance between the tips of said second teeth in the longitudinal direction relative to the bar seat being half of the pitch of adjacent said first teeth.

2. A reel seat for a fishing reel which has an attachment reel foot comprising;

a bar seat having arched attachment surfaces adapted to abut against the fishing rod; a hood member for receiving one end of the reel foot fixedly provided at one end of said seat; first toothed members provided on the upper side of said seat member; slide way means provided lengthwise on both sides of said seat member; and securing means including a casing having engaging surfaces for engaging said slide way means and slidable on said seat member, said casing having a socket for receiving the other end of the reel foot, pawl means pivotedly mounted on said casing, spring means normally biassing said pawl means to engage said first toothed members, and a hand operated means for moving said pawl means against the biassing action of said spring means, said pawl means including three pivoted parallel arms each of which has a third tooth, the distance between the tips of adjacent third teeth in the longitudinal direction relative to the bar seat being one third of the pitch of adjacent said first teeth

* * * * *

UNITED STATES PATENT AND TRADEMARK OFFICE
CERTIFICATE OF CORRECTION

PATENT NO. : 4,554,755

DATED : November 26, 1985

INVENTOR(S) : Jeng-Hsiung Hsu

It is certified that error appears in the above-identified patent and that said Letters Patent is hereby corrected as shown below:

Face of Patent, References cited, U.S. Patent Documents,
change Seidel reference issue date from "7/1943" to --7/1942--.

Signed and Sealed this

Eighth Day of April 1986

[SEAL]

Attest:

DONALD J. QUIGG

Attesting Officer

Commissioner of Patents and Trademarks